Sept. 20, 1966 J. MÜLLER ET AL 3,273,909
INDEPENDENT WHEEL SUSPENSION
Filed Nov. 27, 1964

INVENTORS.
JOSEF MÜLLER
ALF JOHN MÜLLER

BY Dicke & Craig

ATTORNEYS.

3,273,909
INDEPENDENT WHEEL SUSPENSION
Josef Müller, Stuttgart-Riedenberg, and Alf John Müller, Stuttgart-Bad Cannstatt, Germany, assignors to Daimler-Benz Aktiengesellschaft, Stuttgart-Unterturkheim, Germany
Filed Nov. 27, 1964, Ser. No. 414,287
Claims priority, application Germany, Nov. 30, 1963, D 43,057
7 Claims. (Cl. 280—96.2)

The present invention relates to an arrangement for the caster adjustment of a steerable wheel guided by means of a guide member, especially for motor vehicles, in which the wheel carrier or steering pin is connected with the guide member in a universal joint-like manner, preferably by means of a ball joint, and aims above all at a simple and reliable caster adjustment, that is insensitive to shock and impact loads and stresses and influences as little as possible the remaining kinematics of the wheel suspension.

Accordingly, the present invention essentially consists in that the joint half on the side of the guide member of the joint connecting the wheel carrier or steering pin with the guide member is constituted by a joint piece or is carried thereby which is adjustably connected with the guide member about a pivot axis parallel or nearly parallel to the steering pin axis.

Preferably the joint piece is for that purpose pivotally supported at the guide member by means of a pivot pin displaced in the transverse direction of the vehicle with respect to the steering pin axis, which pivot pin, for example, is simultaneously constructed as securing screw, is pivotally supported at the guide member and is adapted to be securely clamped to the guide member in an adjustable angular position by means of two clamping screws extending through arcuate slots on the side opposite the pivot pin with respect to the steering pin axis.

The following advantages are realized by the present invention:

The caster adjustment can be realized in the stepless manner, that is continuously. The camber angle of the wheel is practically not influenced by the caster adjustment. The steering roll radius of the wheel and the angle subtended between the wheel plane and the steering pin axis is not changed, since the universal joint is displaced relative to the guide member and not to the wheel carrier or the wheel. Consequently, any asymmetry between the left and the right wheel and therewith an uneven running and brake pulling is avoided. The axle and the steering kinematics do not change.

Additionally, a removal of the parts, for example, for the insertion of shim disks or a similar diassembly at the wheel suspension is not necessary for the adjustment of the caster. Insofar as the adjustment takes place on the upper guide member which as a rule is not loaded by the spring pressure of the wheel spring, simultaneously a good accessibility as well as additionally an adjustment at the vehicle under load are possible.

Additional abutment screws may be provided for the fine caster adjustment which, for example, may be screwed into the guide arms and determine the pivot position of the bearing piece about its pivot pin.

Accordingly, it is an object of the present invention to provide an adjusting device for adjusting the caster of independent wheel suspensions of the type described above which eliminates, by simple means, the shortcomings encountered with the prior art constructions.

Another object of the present invention resides in the provision of an adjusting mechanism for adjusting the caster of a wheel, especially for motor vehicle wheels suspended by means of guide members, which is simple and reliable in operation, is essentially insensitive to impact and shock loads, and effects as little as possible the remaining kinematics of the wheel suspension.

A further object of the present invention resides in the provision of a caster adjusting device for independent wheel suspensions in which the adjustment can be made in a stepless manner such that the camber angle of the wheel is practically uninfluenced by the caster adjustment.

A still further object of the present invention resides in the provision of a caster adjusting device for independent wheel suspensions which is so constructed and arranged that any asymmetry between the left and right wheels are effectively avoided.

A further object of the present invention resides in the provision of a wheel suspension in which the caster may be readily adjusted without the need for installing or disassembling parts thereof, and in which the adjustments may be made even while the vehicle is under load.

These and further objects, features and advantages of the present invention will become more obvious from the following description when taken in connection with the accompanying drawing which shows, for purposes of illustration only, two embodiments in accordance with the present invention, and wherein FIGURE 1 is a partial vertical cross sectional view through a joint connection between the wheel carrier and the guide member of a wheel suspension in accordance with the present invention, taken along line 1—1 of FIGURE 2.

Figure 2:
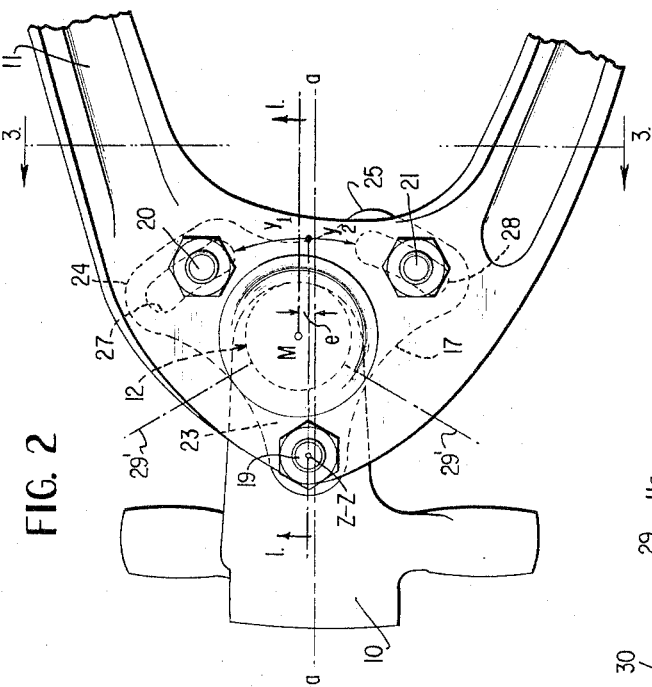
FIGURE 2 is a plan view on the wheel suspension of FIGURE 1.
Figure 1:
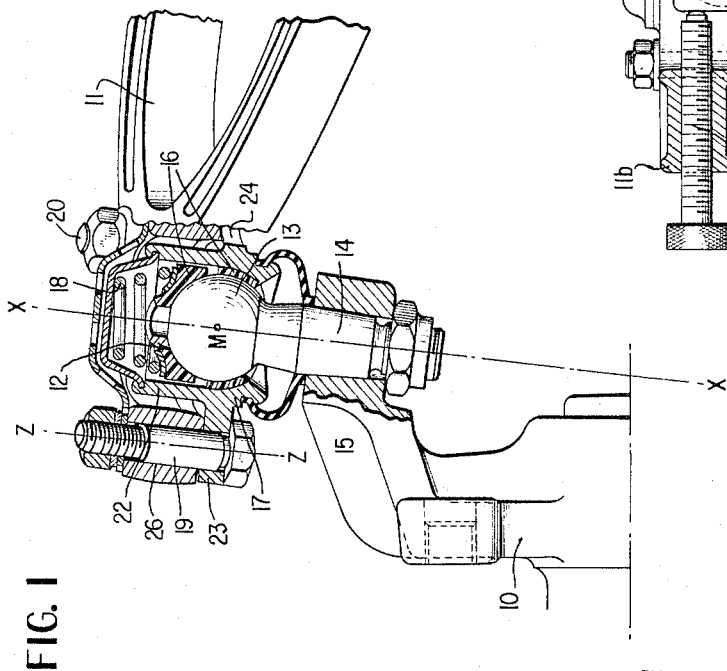

Referring now to the drawing wherein like reference numerals are used throughout the various views to designate like parts, and more particularly FIGURES 1 and 2, the wheel carrier designated therein by reference numeral 10 and guided by means of two cross guide members is pivotally connected with the upper guide member 11 by a ball joint generally designated by reference numeral 12. The connection of the lower guide member (not shown) which as a rule serves for the support of the vehicle spring means, may be connected in a similar or constructionally different manner with the wheel carrier 10 such that a steering pin axis $x$—$x$ is determined by the upper and lower connecting joints about which the wheel is able to pivot or swing during steering movements in the steering direction.

For the formation of the ball joint 12, the ball joint head 13 is rigidly inserted by means of the conical pin 14 into the upper bearing eye 15 of the wheel carrier 10 and is supported in a two-partite bearing socket 16 within a joint piece 17, whereby the upper socket piece 16 is pressed against the ball head 13 by a spring 18.

The joint piece 17 is connected with the upper guide member 11 by three screws or bolts 19, 20, and 21. The joint piece 17 essentially consists of a socket part 22 receiving the two-partite bearing socket 16 and is provided with laterally projecting securing flanges 23, 24, and 25. The screw or bolt 19 having an axis $z$—$z$ extends thereby without play through a bore provided within the securing flange 23 and through a bore 26 provided at the forward end of the guide member 11 on the outside of the steering pin axis $x$—$x$ facing the wheel whereas the screws or bolts 20 and 21 arranged on the opposite inside of the steering pin axis $x$—$x$ within the area of the guide arms extend through the guide member 11 without play, but extend through the joint piece 17, i.e., the securing flanges 24 and 25 thereof with play in the circumferential direction about the axis z—z of the screw or bolt 19, in that the screws or bolts 20 and 21 project through longitudinal slots 27 and 28 provided within the joint piece 17 which are curved about the last-mentioned axis.

For purposes of adjusting the caster, the joint piece 17 may be pivoted with respect to the guide member 11 in the direction of arrow $y_1$ and $y_2$ about the axis z—z of the bolt or screw 19 serving as pivot pin whereby, however, also the center point M of the ball joint 12 is displaced in the direction of arrow $y_1$ and $y_2$ in relation to the guide member 11. The distance e of the joint center point M from the center axis a—a of the wheel and therewith the inclination of the steering pin axis x—x, as seen in the side view of the vehicle, are adjusted thereby.

Figure 3:
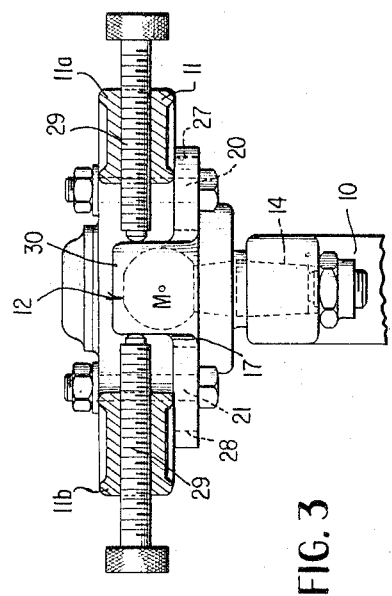
FIGURE 3 is a partial cross sectional view through a modified embodiment of a wheel suspension in accordance with the present invention, taken approximately along the line 3—3 of FIGURE 2 but provided with a fine adjusting mechanism.

The adjustment takes place after loosening the screws or bolts 20 and 21 which are tightened after the adjustment. For purposes of fine adjustment, additional abutment screws 29 may be provided according to FIGURE 3, which, for example, are adjustably arranged in the transverse direction within the guide arms 11a and 11b of the guide member $11_2$ that is, approximately in the direction of the arrows $y_1$ and $y_2$, and which abut, for example, against a central abutment 30 at the joint piece 17.

Under certain circumstances also a single adjusting screw suffices which permits an adjustment in both directions. Furthermore, the screws 29 may also be arranged in the joint piece 17 instead of in the guide member 11.

Particularly appropriate is also an arrangement of the adjusting screws 29 at the places 29' (FIG. 2) at which only threaded bores have to be provided within the joint piece 17. After the adjustment, the screws 29 may in all cases be removed again.

While we have shown and described two embodiments in accordance with the present invention, it is understood that the same is not limited thereto but is susceptible of numerous changes and morifications as known to a person skilled in the art, and we therefore do not wish to be limited to the details shown and described herein but intend to cover all such changes and modifications as are encompassed by the scope of the appended claims.

We claim:

1. An arrangement for adjusting the caster of a wheel guided by means of a guide member, especially for motor vehicles, comprising:
   wheel guide means,
   wheel carrier means,
   and universal joint means including ball joint means operatively connecting said wheel carrier means with said wheel guide means to effectively provide a steering pin axis,
   the joint portion on the side of the wheel guide means of said universal joint means including a joint piece engaging with said ball joint means, and further means for adjustably connecting said joint piece with said wheel guide means for selective movement about a pivot axis at least approximately parallel to the steering pin axis and offset therefrom in the transverse direction of the vehicle so as to pass beyond said ball joint means.

2. An arrangement for adjusting the caster of a wheel guided by means of a guide member, especially for motor vehicles, comprising:
   wheel guide means,
   wheel carrier means,
   and universal joint means including ball joint means operatively connecting said wheel carrier means with said wheel guide means to effectively provide a steering pin axis,
   the joint portion on the side of the wheel guide means of said joint means including a joint piece, and further means for adjustably connecting said joint piece with said wheel guide means about a pivot axis at least approximately parallel to the steering pin axis,
   the further means pivotally supporting said joint piece at said wheel guide means including pivot pin means offset in the transverse direction of the vehicle with respect to said steering pin axis, and means for securely clamping said joint piece onto said wheel guide means in an adjustable angular position including threaded clamping means extending through slots on the side opposite the pivot means in relation to the steering pin axis.

3. An arrangement for adjusting the caster of a wheel guided by means of a guide member, especially for motor vehicles, comprising:
   wheel guide means,
   wheel carrier means,
   and universal joint means including ball joint means operatively connecting said wheel carrier means with said wheel guide means to effectively provide a steering pin axis,
   the joint portion on the side of the wheel guide means of said joint means including a joint piece, and further means for adjustably connecting said joint piece with said wheel guide means about a pivot axis at least approximately parallel to the steering pin axis,
   the further means pivotally supporting said joint piece at said wheel guide means including pivot pin means offset in the transverse direction of the vehicle with respect to said steering pin axis, and means for securely clamping said joint piece onto said wheel guide means in an adjustable angular position including threaded clamping means extending through slots provided within said wheel guide means on the side opposite the pivot pin means in relation to the steering pin axis,
   the pivot pin means being arranged on the side of the wheel in relation to the steering pin axis and the clamping means being arranged on the opposite side within the area of the guide arms of the wheel guide means.

4. An arrangement for adjusting the caster of a wheel guided by means of a guide member, especially for motor vehicles, comprising:
   wheel guide means,
   wheel carrier means,
   and universal joint means including ball joint means operatively connecting said wheel carrier means with said wheel guide means to effectively provide a steering pin axis,
   the joint portion on the side of the wheel guide means of said joint means including a joint piece, and further means for adjustably connecting said joint piece with said wheel guide means about a pivot axis at least approximately parallel to the steering pin axis,
   said joint piece being constructed as ball socket having lateral flanges for the connection of the joint piece with the bearing eye of the wheel guide means, and a plurality of threaded means for securing said joint means at said wheel guide means, one of said threaded means simultaneously forming the pivot pin means for the joint piece.

5. An arrangement for adjusting the caster of a wheel guided by means of a guide member, especially for motor vehicles, comprising:
   wheel guide means,
   wheel carrier means,
   and universal joint means including ball joint means operatively connecting said wheel carrier means with said wheel guide means to effectively provide a steering pin axis,
   the joint portion on the side of the wheel guide means of said joint means including a joint piece, and further means for adjustably connecting said joint piece with said wheel guide means about a pivot axis at least approximately parallel to the steering pin axis, and adjusting screw means for the fine adjustment of the caster arranged in one of two parts consisting of said wheel guide means and said joint piece, said adjusting screw means abutting against the other of said two parts.

6. An arrangement for adjusting the caster of a wheel guided by means of a guide member, especially for motor vehicles, comprising:
wheel guide means,
wheel carrier means,
and universal joint means including ball joint means operatively connecting said wheel carrier means with said wheel guide means to effectively provide a steering pin axis,
the joint portion on the side of the wheel guide means of said joint means including a joint piece, and further means for adjustably connecting said joint piece with said wheel guide means about a pivot axis at least approximately parallel to the steering pin axis,
said joint piece being constructed as ball socket having lateral flanges for the connection of the joint piece with the bearing eye of the wheel guide means, and a plurality of threaded means for securing said joint means at said wheel guide means, one of said threaded means simultaneously forming the pivot pin means for the joint piece,
and adjusting screw means for the fine adjustment of the caster arranged in one of the two parts consisting of said wheel guide means and said joint piece, said adjusting screw means abutting against the other of said two parts.

7. An arrangement for adjusting the caster of a wheel guided by means of a guide member, especially for motor vehicles, comprising:
wheel guide means,
wheel carrier means,
and universal joint means including ball joint means operatively connecting said wheel carrier means with said wheel guide means to effectively provide a steering pin axis,
the joint portion on the side of the wheel guide means of said joint means including a joint piece, and further means for adjustably connecting said joint piece with said wheel guide means about a pivot axis at least approximately parallel to the steering pin axis,
the further means pivotally supporting said joint piece at said wheel guide means including pivot pin means offset in the transverse direction of the vehicle with respect to said steering pin axis, and means for securely clamping said joint piece onto said wheel guide means in an adjustable angular position including threaded clamping means extending through slots provided within said wheel guide means on the side opposite the pivot pin means in relation to the steering pin axis,
the pivot pin means being arranged on the side of the wheel in relation to the steering pin axis and the clamping means being arranged on the opposite side within the area of the guide arms of the wheel guide means,
said joint piece being constructed as ball socket having lateral flanges for the connection of the joint piece with the bearing eye of the wheel guide means, one of said threaded means simultaneously forming the pivot pin means for the joint piece,
and adjusting screw means for the fine adjustment of the caster arranged in one of the two parts consisting of said wheel guide means and said joint piece, said adjusting screw means abutting against the other of said two parts.

References Cited by the Examiner
UNITED STATES PATENTS

| | | | |
|---|---|---|---|
| 2,405,458 | 8/1946 | Slack et al. | 280—96.2 |
| 2,556,767 | 6/1951 | McCann | 280—96.2 |
| 2,886,341 | 5/1959 | MacPherson | 287—90 |
| 2,998,262 | 8/1961 | Hoffman | 280—96.1 |
| 3,026,124 | 3/1962 | Eyb | 280—96.2 |
| 3,103,370 | 9/1963 | Krizman | 280—96.1 |

KENNETH H. BETTS, *Primary Examiner.*